United States Patent
Held

(10) Patent No.: US 7,388,339 B2
(45) Date of Patent: Jun. 17, 2008

(54) ADJUSTMENT DEVICE AND METHOD FOR OPERATION OF A FINAL CONTROL ELEMENT

(75) Inventor: Jochen Held, Forchheim (DE)

(73) Assignee: Brose Fahrzeugteile GmbH & Co. Kommanditgesellschaft, Coburg, Coburg (DE)

(*) Notice: Subject to any disclaimer, the term of this patent is extended or adjusted under 35 U.S.C. 154(b) by 65 days.

(21) Appl. No.: 11/610,431

(22) Filed: Dec. 13, 2006

(65) Prior Publication Data

US 2007/0133958 A1 Jun. 14, 2007

(30) Foreign Application Priority Data

Dec. 13, 2005 (DE) .................. 20 2005 019 464 U

(51) Int. Cl.
*H02P 1/00* (2006.01)
(52) U.S. Cl. .................. 318/283; 318/266; 318/280
(58) Field of Classification Search ................ 318/256, 318/264, 266, 280, 286, 366, 432, 434
See application file for complete search history.

(56) References Cited

U.S. PATENT DOCUMENTS

| | | | |
|---|---|---|---|
| 6,194,855 B1 * | 2/2001 | Lochmahr et al. .......... 318/283 |
| 6,250,013 B1 * | 6/2001 | Apprich ..................... 49/362 |
| 6,773,053 B2 * | 8/2004 | Richter et al. ......... 296/146.16 |
| 2003/0171866 A1 * | 9/2003 | Heinrich et al. ............. 701/49 |

FOREIGN PATENT DOCUMENTS

DE   10-2005-000-753 A1   8/2005

* cited by examiner

Primary Examiner—Rina I Duda
(74) Attorney, Agent, or Firm—White & Case LLP

(57) ABSTRACT

An adjustment device as well as a corresponding method for operation of the final control element in a motor vehicle are specified. In this case, a motor is provided for operation of the final control element, a sensor element is provided for detection of a parameter that characterizes the motor and a control unit, which is connected to the sensor element and to the motor, is provided for control of the motor. The control unit is designed to record the profile of a parameter that characterizes the motor, or of a signal that is derived from it, over the actuating movement, to compare the recorded profile with a switching-off threshold that is dependent on the actuating movement, to stop and/or to reverse the drive if the switching-off threshold is exceeded, and to change the switching-off threshold as a function of the time for which the final control element is switched off. This allows reliable jamming protection, in which the probability of spurious detection of jamming is reduced.

28 Claims, 1 Drawing Sheet

ADJUSTMENT DEVICE AND METHOD FOR OPERATION OF A FINAL CONTROL ELEMENT

FIELD OF THE INVENTION

The invention relates to an adjustment device for a final control element for a motor vehicle. The invention also relates to a method for operation of a final control element for a motor vehicle. In addition, the invention relates to an electronic assembly for controlling the drive for a final control element for a motor vehicle. The invention deals in particular with the identification of jamming, namely an obstruction in the actuating movement of the final control element.

BACKGROUND OF THE INVENTION

The expression "a final control element for a motor vehicle" means any element that is arranged such that it can move in a motor vehicle and be driven, moved, opened or closed by a motor with respect to a stationary part of the motor vehicle, such as the car body. A final control element represents, for example, the windows or windshields, electrically operable doors (e.g. a tailgate), a sliding roof or a motor vehicle seat.

A motor that is driven electrically is used for operation of the final control element. When the final control element is operated, one problem that arises is that an obstruction may be unpredictably located in the actuating movement of the final control element. Jamming such as this must be detected reliably, particularly where the obstruction is a human body part, and appropriate countermeasures must be initiated, such as stopping or reversing the motor.

By way of example, in order to detect jamming, it is known for a sensor element to be used to detect a parameter that characterizes the motor during the operation of the final control element, and to deduce jamming if there is a discrepancy in comparison to normal operation. For example, DE 10 2005 000 753 A1 discloses the torque of the motor, or a signal that is correlated with the torque of the motor, being recorded over the adjustment range of the final control element and for jamming to be detected if the recorded signal or torque exceeds a response threshold. In this case, provision is made in particular for the response threshold to be instantaneously adapted during the adjustment of the final control element, with an increasing time or spatial change in the correlating signal being taken into account.

An adjustment device having a learning capability such as this can admittedly prevent incorrect reversal of the motor, particularly in the event of aging of the system. However, it disadvantageously does not preclude incorrect reversal in the event of brief operation with a change in the freedom of movement of the drive.

SUMMARY OF THE INVENTION

One object of the invention is to specify an adjustment device that has as low a probability as possible of falsely detecting jamming. A further object is to specify a corresponding method for operation of the final control element, as well as an electronic assembly for controlling the drive, with the same advantages.

The first-mentioned object, relating to an apparatus, is achieved according to the invention by an adjustment device for a final control element for a motor vehicle that has a motor for operation of the final control element, a sensor element for detection of a parameter that characterizes the motor, and a control unit, which is connected to both the sensor element and to the motor, for control of the motor. In this case, the control unit is designed to record the profile of the parameter that characterizes the motor or of a signal that is derived from it over the actuating movement, to compare the recorded profile with a switching-off threshold that is dependent on the actuating movement, to stop and/or to reverse the drive if the switching-off threshold is exceeded, and to change the switching-off threshold as a function of the time for which the final control element has been switched off.

In a first step, the invention is based on the observation that, when the final control element is first operated after the final control element has been switched off, spurious detection of jamming occurs more frequently.

In a second step, the invention is based on the recognition that such spurious detection is caused by the fact that the freedom of movement of the system changes while it is switched off. This can occur, for example, if the final control element is stationary for a long time, resulting in a mechanical effect on the drive, which leads to local movement difficulties and thus to more frequent spurious detections. External effects such as temperature, humidity, etc., during the time in which the system is stationary can also influence the overall freedom of movement of the system.

In a third step, the invention recognizes that spurious detection such as this can be avoided if the switching-off threshold is changed as a function of the time for which the final control element has been switched off. If the time for which it has been switched off is taken into account, the switching-off threshold can be changed appropriately to an extent that corresponds to the freedom of movement to be expected from the system. For this purpose, it may be necessary not only to raise the switching off threshold, but also to reduce it. The choice of the mathematical sign of the change in this case depends on the parameter that characterizes the motor. If, for example, the rotation speed is used as the parameter that characterizes the motor, then it is recommended that the switching-off threshold be reduced since a movement difficulty is manifested by a reduced rotation speed. The opposite situation occurs if the torque is used as the parameter that characterizes the motor. In this case, it is recommended that the switching-off threshold be raised, since a movement difficulty is indicated by an increased torque. In particular, the change in the switching-off threshold may also be calculated from the time for which the system has been switched off, and empirical values or model predictions can be taken into account for this purpose. Other parameters may also be included in the calculation.

In particular, a functional relationship can be implemented that indicates the relationship between the switching-off threshold, or the relationship between a change in the switching-off threshold, and the time for which the system has been switched off. Other parameters may also be included in this functional relationship.

In one advantageous refinement to the invention, the relationship between the switching-off threshold and the time for which it is switched off can be stored in a control map in the control unit. In this case, a change in the value of the switching-off threshold or a corresponding mathematical formula for calculation of a new switching-off threshold from an old one can be preselected for each time the system has been switched off. The control map may be created to be accurate for hours, days or months.

The control unit is advantageously designed to change the switching-off threshold in such a manner that the sensitivity for detection of jamming is reduced. In general, it can be assumed that, after the final control element has been stationary or switched off for a relatively long time, there will be movement difficulty in the system. As already mentioned, this is because the position in which the final control element was stopped mechanically affects the drive. Lubricant residues, dirt, etc., can also be deposited in the mechanical drive while it is stationary, resulting in the system becoming more difficult to move overall. If the switching-off threshold is changed in such a manner that the sensitivity for detection of jamming is reduced, then jamming will not be falsely detected in the event of difficulty in moving, such as that resulting from a stationary period.

If, on the other hand, the stationary period leads to easier movement of the mechanical drive, this would not lead to an increase in the probability of spurious detection of jamming, although it would be possible for a jamming situation not to be identified. On initial operation after a stationary period, the user in this case would not notice any malfunction of the adjustment device. Furthermore, a self-learning adjustment device would have adapted the switching-off threshold again after repeated operation.

The control unit is expediently designed to shift the switching-off threshold through an offset value in order to increase the distance from the profile. In other words, the switching-off threshold that is provided in the control unit before the stationary period of the final control element and that, for example, is matched to local circumstances along the actuating movement, in particular by means of self-learning, is shifted overall through an offset value in such a manner that the profile of the switching-off threshold is at an increased distance from the profile of the parameter. This permits a greater discrepancy between the parameter that characterizes the motor and the nominal value, thus reducing the overall sensitivity for jamming. If, for example, the rotation speed of the motor is recorded as the parameter that characterizes it, then the rotation speed is reduced in the event of a local movement difficulty. In this case, the switching-off threshold must be reduced overall. If the torque of the driving motor is detected as the parameter that characterizes the motor, then this increases if the freedom of movement of the system deteriorates. Consequently, the switching-off threshold in this case must be raised in order to achieve reduced detection sensitivity.

In a further advantageous refinement, the control unit is designed to change the switching-off threshold locally at preselected actuating movement values. This variant offers the advantage that the sensitivity for detection of jamming is not influenced at many points along the actuating movement. The switching-off threshold is adapted only at locally known adjustment positions, in order to reduce the probability of spurious detection of jamming, and thus of incorrect operation, for example the reversal of the motor.

In particular, known movement difficulty points can be provided as preselected local actuating movement values, or the actuating movement values may be calculated in advance on the basis of the given drive characteristics from a final control element position. The latter case is particularly suitable for a mechanical drive in which the position of the final control element is affected while it is stationary. A disturbance point such as this may also occur, for example, if the final control element is closed when the outside temperature is high. In this case, the driving motor operates with a high force level and with a high torque, with a corresponding force acting on one tooth of a drive gearwheel. During operation of the final control element, a local defect such as this leads to a periodically recurring movement difficulty, at which the switching-off threshold (that for example has already been learnt) is overshot on initial operation after a stationary period. This is prevented by calculating the periodically recurring movement difficulty in advance, and by reducing the sensitivity for detection of jamming at this point, by appropriately changing the switching-off threshold.

Furthermore, the control unit is advantageously designed to cancel the change in the switching-off threshold as a function of time. For this purpose, by way of example, it is possible to take account of the number of operations of the final control element after a time in which it was stationary. Because the changes that result from a stationary period of the final control element are normalized again in the drive after a corresponding operating time, the sensitivity for detection of jamming is returned to a desired value. Alternatively, the change can also be cancelled after a preselected time. It is also feasible for the change to be gradually reduced in steps or with a reduction factor that is correlated with time. The change can also be cancelled on the basis of an exponential function with time.

In a further advantageous refinement, the control unit is designed to cancel the change in the switching-off threshold as a function of the detected actual profile. If no change in the recorded profile of the parameter that characterizes the motor is detected when the final control element is first operated, then the change in the switching-off threshold can be cancelled immediately.

It may be advantageous for both the application of the change and the cancellation of the change to be carried out in steps. This makes it possible to take account of instantaneous circumstances because the next change step can be applied or ignored, for example, as a function of existing movement difficulty.

In one expedient refinement, the control unit is designed to change the switching-off threshold as a function of a parameter that characterizes the operating state of the motor vehicle and/or the environment. This makes it possible to weight the change in the switching-off threshold, which is dependent on the time for which it is being switched off, with such a parameter. For example, a major temperature change may occur when it is switched off for a short time, from which it can be deduced that a major change in the switching-off threshold is necessary. On the other hand, a long switch-off time may lead to no change in the drive system, since external parameters have remained constant. An outside temperature, a temperature profile, a temperature difference between the motor vehicle and the outside temperature, and/or a battery voltage may advantageously be provided as the parameter that characterizes the environment and/or the operating state. If, for example when the motor vehicle has been stationary for a relatively long period, then the battery voltage decreases; this reduces the rotation speed of the motor driving the final control element. This change can be taken into account in the prediction of the change to the switching-off threshold. If the parameter that characterizes the motor is the rotation speed, the switching-off threshold must in this case be reduced.

Since the change in the freedom of movement of the system is governed not only by the value of an external parameter at a particular time before and after the time during which it was stationary, but also by its profile while it was stationary, it is advantageous for the control unit to be designed to detect the parameter that characterizes the operating state of the motor vehicle and/or the environment during a time in which the motor vehicle is stationary, in particular at preselected intervals. For this purpose, by way of example, the control unit can alert the motor vehicle electronics at preselected intervals, can detect the parameter and can determine a profile of the parameter during the time in which it is switched off. This profile can then be taken into account in the calculation of the intended change to the switching-off value.

In one expedient refinement, the control unit is designed to determine a switching-off threshold value and a readjustment value, which is closer to the profile, in places from the recorded profile, if the profile does not exceed the readjustment value in the previous section, and to freeze the switching-off threshold value if the profile exceeds the readjustment value in the previous section.

With a refinement such as this, the profile of the switching-off threshold that defines the driving motor being switched off or reversed is matched on a self-learning basis to the actually prevailing conditions on operation of the final control element. For this purpose, determine a readjustment value that is dependent on the actuating movement and is closer to the profile of the parameter that characterizes the motor than the given switching-off threshold. The switching-off threshold is retained or adapted as a function of the readjustment value, which is dependent on the actuating movement. For this purpose, checks are carried out in places along the actuating movement to determine whether the given profile of the parameter that characterizes the motor exceeds the given readjustment value. If this is not the case, then a new switching-off threshold value and a new readjustment value are calculated for the next section from the given value of the parameter that characterizes the motor. This can be done, for example, by integration from the previous profile, with empirical values being included or with the capability to take account of known circumstances over the actuating movement of the final control element. A given profile of the switching-off value can also be adapted appropriately to the actual circumstances. If the measured profile of the parameter that characterizes the motor exceeds the readjustment value preselected in the section, then the switching-off threshold value is frozen for the next section. If the profile of the parameter that characterizes the motor then exceeds the frozen switching-off threshold value in the next section, then jamming is identified. The motor is stopped or driven in reverse. If the profile of the parameter that characterizes the motor exceeds only the readjustment value during the next section, the old switching-off threshold value is still retained. If the profile of the parameter that characterizes the motor exceeds neither the readjustment value nor the preselected switching-off threshold value in the next section, then a new readjustment value and a new switching-off threshold value are defined for the next but one section.

These measures are used to learn changing circumstances during the actuating movement of the final control element. The switching-off threshold is defined during the operation of the final control element. The combination of a method such as this with the described consideration of a relatively long time during which the final control element has been switched off leads to the avoidance of spurious detection of jamming even when the final control element is switched on for the first time after having been switched off for a relatively long time. The switching-off threshold and the readjustment value are then matched to the actual circumstances by repeated operation of the final control element.

In one advantageous refinement of the invention, a rotation speed detection device, in particular a Hall sensor, is provided as the sensor element, with the control unit being designed to record the rotation time, the rotation speed or the torque of the motor over the adjustment range as the profile of the parameter that characterizes the motor. Not only the rotation time but also the rotation speed and the torque of the motor represent the parameter that characterizes the motor, from which the profile of the freedom of movement of the final control element can be deduced as a function of the actuating movement. For example, for a preselected control voltage, the rotation time and the rotation speed of the motor decrease if there is movement difficulty in the actuating movement of the final control element. If, by way of example, the motor torque is deduced from its power consumption and speed of revolution, this torque is increased at points where there is a movement difficulty in the actuating movement of the final control element.

It is, of course, possible to use a drive voltage or a drive current as variables that characterize the motor. One simple and reliable possibility for obtaining a parameter that characterizes the motor is to use a rotation speed detection device. In this case, it is known for a Hall sensor to emit pulses proportional to the rotation speed. For this purpose, a ring magnet is mounted on the drive shaft. The magnetic field, which varies over time during rotation as a result of the ring magnet, induces a periodic Hall voltage in the Hall sensor. The actuating movement of the final control element can be recorded on a spatially resolved basis by counting the voltage pulses generated by the Hall sensor. To this extent, this refinement can also be used to locally change the switching-off threshold where there is a known movement difficulty.

The second-mentioned object relating to a method is achieved according to the invention by a method for operation of a final control element for a motor vehicle by control of a motor that drives the final control element, with the profile of a parameter that characterizes the motor or of a signal that is derived from it being recorded over the actuating movement, with the recorded profile being compared with a switching-off threshold that is dependent on the actuating movement, with the drive being stopped and/or reversed if the switching-off threshold is exceeded, and with the switching-off threshold being changed as a function of the time for which the final control element is switched off.

Advantageous refinements according to the method can be found in the corresponding dependent claims. In this case, the advantages that have been described above for an apparatus can be transferred in the same sense to advantageous refinements of the method.

The object relating to an assembly is achieved according to the invention by an electronic assembly for controlling the drive of a final control element of a motor vehicle, which has a microprocessor for carrying out the described method.

BRIEF DESCRIPTION OF THE DRAWING

One exemplary embodiment of the invention will be explained in more detail with reference to a drawing, FIG. 1, which shows, schematically, an adjustment device for driving a motor vehicle side window that can be driven electrically.

DETAILED DESCRIPTION

Figure 1:
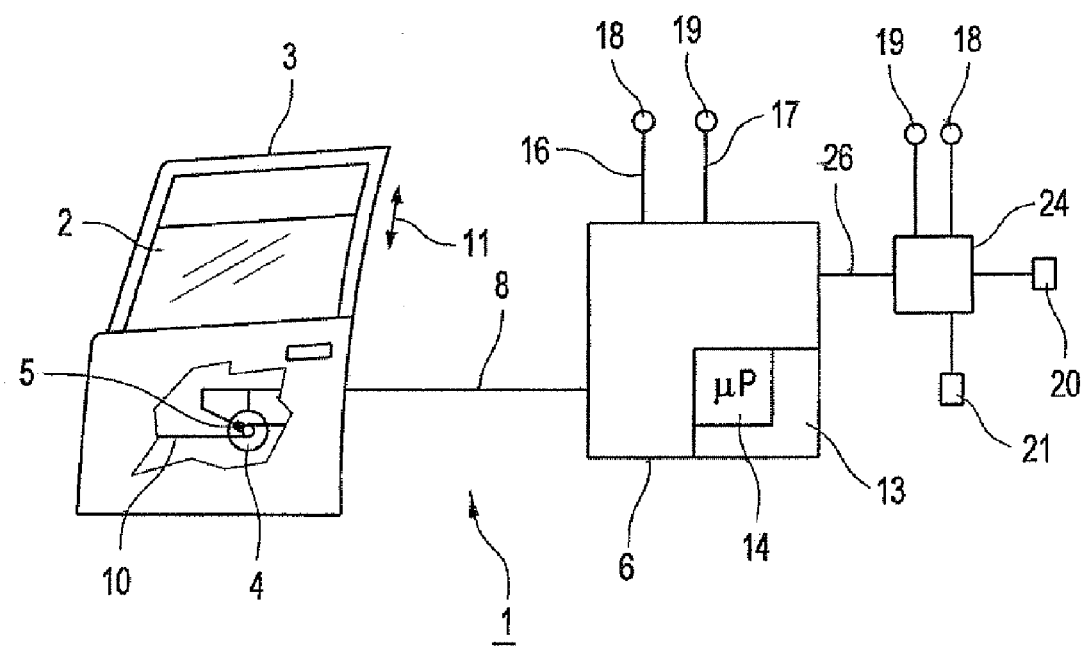

FIG. 1 shows, schematically, an adjustment device 1 that is used as a motor vehicle final control element 2 that can be operated in order to drive a side window that can be driven electrically. A side door 3 is shown as part of the motor vehicle, whose side window can be opened and closed by an electric motor 4, as the final control element 2, arranged in the door lining. The final control element 2 is shown in the half-open position.

The motor, which is visible because the outer metal sheet of the door has been partially removed, has an associated Hall sensor as the sensor element 5, which measures the rotation speed of the motor 4 by means of a ring magnet that is placed on the drive shaft of the motor 4.

In addition to the final control element 2 and the associated motor 4 as well as the sensor element 5 associated with the motor 4, the adjustment device 1 has a control unit 6 that is connected via a control line 8 both to the motor 4 and to the sensor element 5. In this case, not only are control signals sent via the control line 8 from the control unit 6 to the motor 4, but information relating to the position of the final control element 2 and relating to the rotation speed of the motor 4 is also received. By way of example, signals such as these comprise the voltage pulses from the Hall sensor.

In order to drive the motor 4, the control unit 6 sends appropriate control signals via the control line 8. The motor 4 then operates the final control element 2 via a drive element 10, which is not illustrated in detail. The side window that is illustrated as the final control element 2 is then either closed or opened, corresponding to the direction of the arrows 11.

In order to drive the final control element 2, the control unit 6 has an electronic assembly 13 that has a microprocessor 14. Furthermore, via connecting lines 16 and 17 and respective connections 18 and 19, the control unit 6 has an associated temperature sensor 20 as well as a voltage sensor 21. In order to generate the appropriate measurement data, the temperature sensor 20 and the voltage sensor 21 have associated measurement electronics 24. The measurement electronics 24 can be operated by the control unit 6 via a control line 26.

During the operation of the final control element 2 by means of the motor 4, the control unit 6 registers the rotation speed as the parameter that characterizes the motor via the voltage pulses from the Hall sensor, which is used as the sensor element 5. In other words, during operation of the final control element 2, the control unit 6 receives a profile of the rotation speed over the actuating movement. In the microprocessor 14, a switching-off threshold value and a readjustment value for the rotation speed profile are in each case produced in sections from the rotation speed profile that has been obtained, based on empirical values. The rotation speed profile is compared in places with the correspondingly calculated switching-off threshold. By way of example, one or more complete revolutions of the motor may be defined as one section. If the rotation speed within the observed section falls below the readjustment value, then no new switching-off threshold value is calculated for the next section. Otherwise, the switching-off threshold value is determined from the given profile for the next section. If the determined rotation speed falls below the switching-off threshold value, then the motor is driven in reverse. Jamming is identified. The control thus learns how to match itself to changing circumstances during operation of the final control element 2, in the course of the actuating movement.

At the same time, the control unit 13 records the time for which the final control element 2 has been switched off. During the time for which the final control element 2 has been switched off, the control unit 6 also activates the measurement electronics 24 at preselected time intervals. This results in the control unit 6 receiving the profile of the outside temperature and of the battery voltage, generated by the appropriate measurement points, during the time in which the final control element 2 is switched off. For this purpose, the generated measurement data from the temperature sensor 20 and from the voltage sensor 21 are called up when the measurement electronics 24 are activated.

A value table is stored in the control unit 6, containing a calculation function with daily accuracy for a measured time for which it is switched off, which determines an offset value on the basis of the determined temperature profile and the determined battery voltage, with this offset value being that by which the switching-off threshold is reduced. When the final control element 2 is operated for the first time after having been switched off, this leads to a reduction in the sensitivity for detection of jamming. The offset value is gradually cancelled out. This is done in particular by means of the described self-learning algorithm.

In a further variant, local movement difficulties in the actuating movement of the final control element 2 are stored in the control unit 6. Any periodic movement difficulty along the actuating movement resulting from an effect on the mechanical system during the time in which it is switched off can also be calculated on the basis of the rest position of the final control element 2. The offset value, which can be obtained from the value table or can be calculated, is subtracted from these local movement difficulties on initial operation of the final control element 2, after a time in which it has been switched off, corresponding to the given switching-off threshold.

Incorporated by reference herein in their entirety are Germany priority application number 20 2005 019 464.6, filed Dec. 13, 2005, and its certified English language translation, copies of both of which documents are filed concurrently herewith.

What is claimed is:

1. An adjustment device for a final control element for a motor vehicle, comprising:
    a motor for operation of the final control element, comprising:
        a sensor element for detection of a parameter that characterizes the motor; and
        a control unit coupled to the sensor element and to the motor for control of the motor, the control unit adapted to:
            record a profile of the parameter and a signal derived from the parameter over an actuating movement of the final control element;
            compare the recorded profile of the parameter with a switching-off threshold that is dependent on the actuating movement;
            perform at least one of (i) stopping and (ii) reversing a drive, associated with the motor, and operating the final control element, if the switching-off threshold is exceeded by the recorded profile of the parameter; and
            change the switching-off threshold as a function of the time for which the final control element has been switched off.

2. The adjustment device according to claim 1, wherein a relationship between the switching-off threshold and the time for which the final control element has been switched off is stored in a control map in the control unit.

3. The adjustment device according to claim 1, wherein the control unit is adapted to change the switching-off threshold in such a manner that the sensitivity for detection of jamming is reduced.

4. The adjustment device according to claim 3, wherein the control unit is adapted to shift the switching-off threshold through an offset value in order to increase the distance from the profile.

5. The adjustment device according to claim 1, wherein the control unit is adapted to change the switching-off threshold locally at preselected values of the actuating movement values.

6. The adjustment device according to claim 5, wherein the control unit is adapted to perform at least one of the functions selected from the group consisting of (i) providing known movement difficulty points, as preselected actuating movement values, and (ii) calculating the actuating movement values in advance based on the given drive characteristics from a final control element position.

7. The adjustment device according to claim 1, wherein the control unit is adapted to cancel the change in the switching-off threshold as a function of time.

8. The adjustment device according to claim 1, wherein the control unit is adapted to cancel the change in the switching-off threshold as a function of the detected actual profile.

9. The adjustment device according to claim 1, wherein the control unit is adapted to change the switching-off threshold in steps.

10. The adjustment device according to claim 1, wherein the control unit is adapted to change the switching-off threshold as a function of a parameter that characterizes the operating state of the motor vehicle and/or the environment.

11. The adjustment device according to claim 10, wherein the control unit is adapted to provide at least one of the group consisting of an outside temperature, a temperature profile, a temperature difference between the motor vehicle temperature and the outside temperature, and a battery voltage, as the parameter that characterizes at least one of the environment and the operating state.

12. The adjustment device according to claim 10, wherein the control unit is adapted to detect parameters that characterize at least one of the operating state of the motor vehicle and the environment during a time in which the motor vehicle is stationary.

13. The adjustment device according to claim 1, wherein the control unit is adapted to determine a switching-off threshold value and a readjustment value if the profile does not exceed a determined readjustment value that is dependent on the actuating movement and is closer to the profile of the parameter that characterizes the motor than the given switching-off threshold, and freezes the switching-off threshold value if the profile exceeds a determined readjustment value that is dependent on the actuating movement and is closer to the profile of the parameter that characterizes the motor than the given switching-off threshold.

14. The adjustment device according to claim 1, wherein the sensor element is a rotation speed detection device comprising a Hall sensor and the control unit is adapted to record at least one of the rotation time, the rotation speed, and the torque of the motor over the adjustment range as the profile of the parameter that characterizes the motor.

15. A method for operation of a final control element for a motor vehicle by control of a motor that drives the final control element, comprising the steps of:
recording the profile of at least one of a parameter that characterizes the motor and a signal that is derived from the parameter over an actuating movement of the final control element;
comparing the recorded profile with a switching-off threshold that is dependent on the actuating movement;
performing at least one of stopping and reversing the drive if the switching-off threshold is exceeded; and
changing the switching-off threshold as a function of the time for which the final control element is switched off.

16. The method according to claim 15, wherein the change in the switching-off threshold is taken from a control map.

17. The method according to claim 15, wherein the switching-off threshold is changed in such a manner that the sensitivity for detection of jamming is reduced.

18. The method according to claim 17, wherein the switching-off threshold is shifted through an offset value in order to increase the distance from the profile.

19. The method according to claim 15, wherein the switching-off threshold is changed locally at one or more preselected actuating movement values.

20. The method according to claim 19, wherein at least one of the following conditions obtains: known movement difficulty points are provided as preselected actuating movement values and the actuating movement values are calculated in advance based on the given drive characteristics from a final control element position.

21. The method according to claim 15, wherein the change in the switching-off threshold is cancelled as a function of time.

22. The method according to claim 15, wherein the change in the switching-off threshold is cancelled as a function of the recorded actual profile.

23. The method according to claim 15, wherein the change in the switching-off threshold is carried out in steps.

24. The method according to claim 15, wherein the change in the switching-off threshold is a function of a parameter that characterizes the operating state of at least one of the motor vehicle and the environment.

25. The method according to claim 24, wherein at least one of an outside temperature, a temperature profile, a temperature difference between motor vehicle temperature and the outside temperature, and a battery voltage is used as the parameter that characterizes at least one of the environment and the operating state.

26. The method according to claim 24, wherein the parameter that characterizes the operating state of at least one of the motor vehicle and the environment is detected during a time in which the motor vehicle is stationary.

27. The method according to claim 15, wherein a switching-off threshold value and a readjustment value are determined if the profile does not exceed a determined readjustment value that is dependent on the actuating movement and is closer to the profile of the parameter that characterizes the motor than the given switching-off threshold, and with the switching-off threshold value being frozen if the profile exceeds a determined readjustment value that is dependent on the actuating movement and is closer to the profile of the parameter that characterizes the motor than the given switching-off threshold.

28. An electronic assembly for controlling the drive of a final control element of a motor vehicle having a microprocessor for carrying out the method according to claim 15.

* * * * *